United States Patent [19]

Matsuoka et al.

[11] Patent Number: 4,847,707

[45] Date of Patent: Jul. 11, 1989

[54] ROTARY HEAD TYPE REPRODUCING APPARATUS WITH CROSSTALK REDUCTION

[75] Inventors: Hidetoshi Matsuoka, Tokyo; Masahito Natsume, Matsudo, both of Japan

[73] Assignee: Canon Kabushiki Kaisha, Tokyo, Japan

[21] Appl. No.: 924,695

[22] Filed: Oct. 29, 1986

[30] Foreign Application Priority Data

Nov. 8, 1985 [JP] Japan ............................ 60-2487691
Nov. 8, 1985 [JP] Japan .............................. 60-248770

[51] Int. Cl.$^4$ ........................................... G11B 15/14
[52] U.S. Cl. .................................... 360/64; 360/22; 360/67; 369/134
[58] Field of Search ............... 360/30, 64, 84, 108, 360/22, 67, 124; 369/134

[56] References Cited

U.S. PATENT DOCUMENTS

| 3,197,574 | 7/1965 | Zane ................................ 360/22 X |
| 3,843,573 | 10/1974 | Kosaka ........................... 360/67 X |
| 3,903,360 | 9/1975 | Kamisaka et al. ............. 369/107 X |
| 4,291,343 | 9/1981 | Riddle, Jr. ......................... 360/30 |
| 4,331,992 | 5/1982 | Klein et al. ...................... 360/124 |
| 4,517,612 | 5/1985 | Rijckaert et al. .................. 360/67 |

FOREIGN PATENT DOCUMENTS

| 53-116126 | 10/1978 | Japan ................................... 360/30 |
| 60-52902 | 3/1985 | Japan ................................. 360/108 |

Primary Examiner—Aristotelis M. Psitos
Attorney, Agent, or Firm—Robin, Blecker & Daley

[57] ABSTRACT

A rotary head type reproducing apparatus having a plurality of rotary transmitters which respectively receive signals reproduced from a record bearing medium by a plurality of rotary heads is arranged to eliminate any cross-talk between the rotary transmitters by adjusting the levels of signals produced from these transmitters relative to each other and then by performing a computing operation on the adjusted signal levels.

2 Claims, 2 Drawing Sheets

ROTARY HEAD TYPE REPRODUCING APPARATUS WITH CROSSTALK REDUCTION

BACKGROUND OF THE INVENTION

1. Field of the Invention

This invention relates to a rotary head type reproducing apparatus and more particularly to a rotary head type reproducing apparatus of the kind obtaining a reproduced signal through a rotary transmitter.

2. Description of the Related Art

FIGS. 1(a), 1(b) and 1(c) of the accompanying drawings schematically show rotary transmitters arranged, for example, in two channels. Each channel is provided with coils 11a and 11b or 12a and 12b. The coils 11a and 12a are disposed on the side of a rotor 23 while coils 11b and 12b are disposed on the side of a stator 24. A motor shaft 22 is secured to the rotor 23 and to a rotary upper drum which is not shown but is provided with reproducing heads. The stator 24 is secured to a stationary lower drum 25. A short-circuit ring 26 is arranged to suppress a cross-talk between the two channels.

With the transmitters arranged within a reproducing apparatus, a plurality of reproducing rotary heads reproduce signals from a recording medium. The reproduced signals are respectively produced through the rotary transmitter 11a and 11b and the other rotary transmitter 12a and 12b. The efforts to reduce a cross-talk which takes place between the channels of rotary transmitters during reproduction have been directed solely to improvement in the characteristics of the rotary transmitters. However, the attainable degree of such improvement is limited. It has been thus impossible to have these channels completely unaffected by each other.

SUMMARY OF THE INVENTION

It is a general object of this invention to solve the above-stated problem of the prior art.

It is a more specific object of this invention to provide a rotary head type reproducing apparatus which is capable of eliminating the adverse effect of a cross-talk between a plurality of channels of rotary transmitters on reproduced signals solely by means of an external circuit without having recourse to improvement in characteristics of the rotary transmitters.

To attain this object, a rotary head type reproducing apparatus embodying this invention comprises a plurality of rotary heads arranged to reproduce signals recorded on a record bearing medium by tracing on the medium; a plurality of rotary transmitters which are arranged to receive signals reproduced by the rotary heads respectively; level adjusting means arranged to produce output signals of the plurality of rotary transmitters by adjusting their levels relative to each other; and computing means for computing the output signals of the rotary transmitters after these signals are level adjusted by the level adjusting means.

Further objects of this invention will become apparent from the following detailed description of preferred embodiments thereof taken in connection with the accompanying drawings.

BRIEF DESCRIPTION OF THE DRAWINGS

FIG. 1(a) is a plan view, FIG. 1(b) a sectional view and FIG. 1(c) a circuit diagram of the transmitters.

DETAILED DESCRIPTION OF THE PREFERRED EMBODIMENTS

Figure 1:
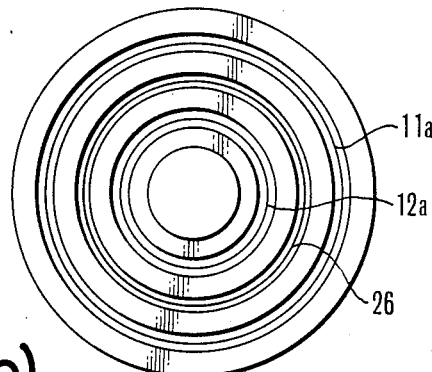
FIGS. 1(a), 1(b) and 1(c) schematically show the arrangement of rotary transmitters arranged in two channels.
Figure 2:
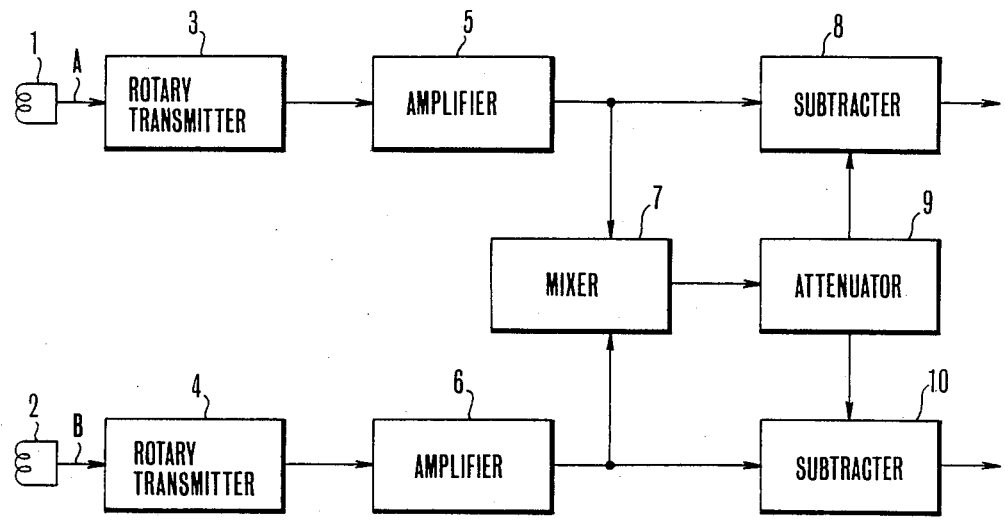
FIG. 2 is a block diagram showing a reproducing apparatus arranged as an embodiment of this invention.

FIG. 2 shows in a block diagram a reproducing apparatus arranged as an embodiment of this invention. The illustration includes a reproducing head 1 which is provided for a channel A. Another reproducing head 2 is provided for a channel B. The heads 1 and 2 are arranged to trace a record bearing medium respectively. Rotary transmitters 3 and 4 are respectively arranged for the channels A and B. Amplifiers 5 and 6 are arranged to amplify reproduced signals of the channels A and B which are obtained via the rotary transmitters 3 and 4. A mixer 7 is arranged to mix the outputs of the amplifiers 5 and 6. A reference numeral 9 denotes an attenuator. Subtracters 8 and 10 are arranged to subtract the output of the attenuator 9 from the outputs of the above-stated amplifiers 5 and 6 respectively.

With the reproducing apparatus arranged as described above, the amplifier 5 produces an output which is expressed as $A+KB$ and the amplifier 6 an output which is expressed as $B+K'A$. In these formulas, A represents the output of the head 1, B that of the head 2, $K'A$ a cross-talk output of the head 1 coming to the rotary transmitter 4, KB a cross-talk output of the head 2 coming to the rotary transmitter 3, and K and K' the rates of the cross-talks, respectively. With the output levels of the amplifiers 5 and 6 mixed by the mixer 7, the mixer 7 produces an output at a level which can be expressed as follows:

$$A+KB+B+K'A$$

Generally the rates of cross-talks may be regarded as $K=K'$. The output level of the mixer 7 then can be expressed as: $(1+K)(A+B)$. The attenuator 9 is arranged to have its attenuating degree set at $1/(1+K)$. Then, the output level of the attenuator 9 becomes: $A+B$. Accordingly, the output level of the subtracter 8 becomes: $A+B-(A+KB)=B-KB=B(1-K)$ while that of the other subtracter 10 becomes:

$$(A+B)-(B+K'A)=A(1-K')$$

As apparent from the foregoing, no cross-talk component is included in the signal components A and B thus obtained.

While the embodiment described is arranged to have two channels, the invention is likewise applicable to other arrangement to have three or more channels by just increasing the computing stages. The output of such modification also can be obtained without including any cross-talk component therein.

Figure 3:
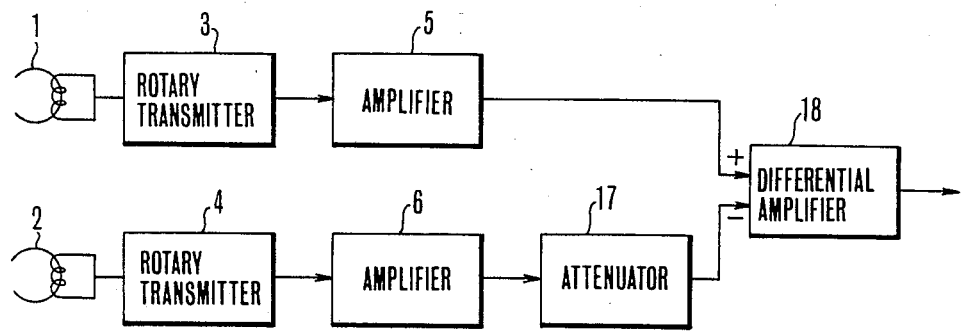
FIG. 3 is a block diagram showing another reproducing apparatus arranged as another embodiment of this invention.

FIG. 3 shows in a block diagram a reproducing apparatus arranged as another embodiment of this invention. This embodiment includes a reproducing head 1 for a channel A; another reproducing head 2 for another channel B; rotary transmitters 3 and 4 for these channels A and B; amplifiers 5 and 6 which are arranged to amplify reproduced signals of the channels A and B obtained via the rotary transmitters 3 and 4; an attenuator 17; and a differential amplifier 18.

With the reproducing apparatus arranged as described above, the amplifier 5 produces an output which can be expressed as A+KB, and the amplifier 6 an output which can be expressed as B+KA. In these formulas, A represents the output of the head 1, B that of the head 2, KA a cross-talk output of the head 1 coming to the rotary transmitter 4, KB a cross-talk output of the head 2 coming to the rotary transmitter 3, and K the rate of the cross-talk, respectively.

Assuming that the attenuator 17 is arranged to have its attenuating degree set at K, the output level of the attenuator 17 becomes:

$$K(B+KA)=KB+K^2A \neq KB$$

Since $K^2A$ is at a very low level, it is ignorable in this instance.

The differential amplifier 18 is arranged to have the output of the amplifier 5 supplied to its noninverting input terminal and the output of the attenuator 17 to it inverting input terminal. Therefore, the output of the differential amplifier 18 becomes: $A+KB-KB=A$. Thus, the cross-talk from the head 2 is removed and the output of the head 1 alone can be taken out excluding the cross-talk component.

While the output of the head of the channel A is alone described in the foregoing, the circuit arrangement can be made in the same manner for the output of the head of the other channel B.

In the specific embodiment described, the differential amplifier is employed for the purpose of removing the cross-talk component. However, this arrangement may be changed to invert either one of the input signals and to use a simple mixer.

Further, in the embodiments described, two channels are arranged. However, a reproduced signal free of any cross-talk component is likewise obtainable by suitably combining the computing arrangement described even in the case of three or more channels.

In accordance with this invention, as described in the foregoing, the cross-talk between the rotary transmitters can be removed by a simple arrangement.

What is claimed is:

1. A rotary head type reproducing apparatus comprising:
   (a) a pair of rotary heads arranged to reproduce signals recorded on a record bearing medium by tracing on the medium;
   (b) a pair of rotary transmitters which are arranged to receive signals reproduced by said pair of rotary head respectively;
   (c) mixing means for forming a mixed signal by mixing output signals of said pair of rotary transmitters;
   (d) level adjusting means for adjusting the level of said mixed signal; and
   (e) a pair of subtracting means arranged respectively to substract the output signals of said pair of rotary transmitters from said mixed signal after the level of which is adjusted by said level adjusting means.

2. An apparatus according to claim 1, wherein a degree to which the level of said mixed signal is to be adjusted by said level adjusting means is set according to the degree of a cross-talk between said pair of rotary transmitters.

* * * * *